United States Patent [19]
Aihara

[11] Patent Number: 5,528,668
[45] Date of Patent: Jun. 18, 1996

[54] MOBILE COMMUNICATIONS SYSTEM AND COMMUNICATION CHANNEL CONTROL METHOD FOR THE SAME

[75] Inventor: Makoto Aihara, Tokyo, Japan

[73] Assignee: NEC Corporation, Tokyo, Japan

[21] Appl. No.: 239,965

[22] Filed: May 9, 1994

[30] Foreign Application Priority Data

May 10, 1993 [JP] Japan ................................. 5-107972

[51] Int. Cl.⁶ ....................................................... H04Q 7/22
[52] U.S. Cl. ............................ 379/60; 379/59; 370/58.1; 370/95.1
[58] Field of Search ................................. 379/58, 59, 60; 455/33.1, 33.2; 370/95.1, 95.3, 60, 60.1, 16, 58.1

[56] References Cited

U.S. PATENT DOCUMENTS 5,119,375  6/1992  Paneth et al. ........................ 379/59 X

OTHER PUBLICATIONS

GSM Recommendation 08.52, "Base Station Controller (BSC) to Base Transceiver Station (BTS) Interface Principles", Version 3.0.1, pp. 1–15, (1989).

GSM Recommendation 08.60, "Inband Control of Remote Transcoders and Rate Adaptors", Version 3.2.0, pp. 1–29, (1990).

Primary Examiner—Curtis Kuntz
Assistant Examiner—G. J. Oehling
Attorney, Agent, or Firm—Foley & Lardner

[57] ABSTRACT

In the construction of a mobile communications system wherein coder-decoder units for high-efficiency coding which should originally be placed in base stations are arranged in a concentrated manner in a mobile exchange office, a circuit changing-over switch is provided as a part of the communications circuits extending from the base stations to the mobile exchange office and the coder-decoder units in the same office. Consequently, the total number of coder-decoder units is reduced to a number which is smaller than the total number of base stations and which corresponds to the volume of traffic of the entire system. Further, when a communication channel is prepared at the time of a call origination or hand-over, since the setting of a communication channel is completed after synchronization is established between a base station and a coder-decoder unit, interruptions of the service are prevented at an initial stage of setting of a communication channel.

1 Claim, 4 Drawing Sheets

MOBILE COMMUNICATIONS SYSTEM AND COMMUNICATION CHANNEL CONTROL METHOD FOR THE SAME

BACKGROUND OF THE INVENTION

FIELD OF THE INVENTION

This invention relates to the construction of a mobile communications system, particularly to a digital mobile communications system to which high-efficiency coding is applied and a communication channel control method for the mobile communications system.

DESCRIPTION OF THE RELATED ART

In a mobile communications system, an audio signal is presently converted into a digital signal coded by high-efficiency coding to achieve effective utilization of radio frequencies. In a mobile communications system, in order to establish an interface with a general public network, an audio signal must be converted into a PCM signal of 64 Kbps. Since a mobile exchange office and a base station are generally separated by a great distance from each other, they are connected to each other by way of a general transmission line. While high-efficiency coding of an audio signal is originally performed between a mobile station and a base station, in order to make effective use of the transmission line between the mobile exchange office and the base station, a system has been made public in which a coder-decoder unit (transcoder/rate adaption unit) for high-efficiency coding is installed in the mobile exchange office instead of in the base station where the unit should originally be installed. (Refer to Recommendation GSM 08.52, Note 1 annexed to Table 4.1 "Summary of Functional Division Between BTS and BSC/MSC," and paragraph 5.2 "Transcoding/Rate Adaption Outside BTS.")

In this instance, since it is necessary to control the coder-decoder unit for high-efficiency coding that is placed in the mobile exchange office from a format conversion unit (channel codec unit) of the base station, a frame format (TRAU frame), in which an audio signal coded by high-efficiency coding and a control signal are multiplexed, is used between the base station and the mobile exchange office (refer to Recommendation GSM 08.60, Paragraph 4.1 "Remote Control of Transcoders and Rate Adaptors"). Since the multiplexed frame format is used, and also in order to minimize the delay of an audio signal, it is important to establish frame synchronization (time alignment) between the format conversion unit of the base station and the coder-decoder unit for high-efficiency coding of the mobile exchange office. (Refer to Recommendation GSM 08.60 Paragraph 4.6.1 "Time Alignment of Speech Frames.")

Accordingly, in order to set a communication channel, frame synchronization must be established beforehand between the format conversion unit of the base station and the coder-decoder unit for high-efficiency coding of the mobile exchange office.

FIG. 4 is a block diagram showing an example of the construction of a conventional digital mobile communications system wherein a high-efficiency coder-decoder unit for high-efficiency coding is placed in a mobile exchange office (The format conversion unit of each base station is not shown in the figure.).

Communications circuits 91, 92, 93 and 94 extending to mobile exchange office 4 from base stations 21, 22, 31 and 32 which communicate with a mobile station 1 are connected to high-efficiency coder-decoder units 71, 72, 73 and 74 installed in mobile exchange office 4, while a 64 Kbps audio line extending from the other communications party 5 to mobile exchange office 4 is accommodated in channel switch 6. Accordingly, high-efficiency coded signals of, for example, 16 Kbps which are applied for radio communications between mobile station 1 and the base stations and also the control signals between the base stations and mobile exchange office 4 are transmitted by way of communications circuits 91, 92, 93 and 94 which interconnect the base stations and the high efficiency coder-decoder units in mobile exchange office 4. Base stations 21 and 22 have a service area different from the service area of base stations 31 and 32, and a broken line interconnecting mobile station 1 and base station 31 indicates that, as mobile station 1 moves, "hand-over" takes place by which base station 21, which communicates with mobile station 1, is switched over to base station 31 in order to maintain communication with mobile station 1.

Here, a "base station" signifies radio equipment which, with a mobile station, makes up one unit of communications, and therefore, there can be a plurality of base stations in one site having common power equipment, common antenna equipment, etc.

In a conventional digital mobile communications system applying high-efficiency coding, as shown in FIG. 4, the communications circuits 91 to 94 extending from the base stations and the high efficiency coder-decoder units 71 to 74 for high-efficiency coding are connected to each other fixedly in a one-by-one relationship in order to prevent interruptions of the service which may occur before establishment of synchronization between the base station and the high-efficiency coder-decoder unit at the initial stage of setting a communication channel, particularly in the case of hand-over by which a communication route is switched over from one base station to another during a communication.

Accordingly, the number of high-efficiency coder-decoder units involved in a mobile exchange office is equal to the number of communications circuits, that is, the number of base stations, and since a dynamic channel allocation method is adopted in which a radio channel is assigned in response to a request for setting of a communication channel, the number of base stations per site increases, and accordingly, it becomes necessary to increase the number of communications circuits extending from base stations to a mobile exchange office. This gives rise to the problem that a considerably greater number of high-efficiency coder-decoder units than the number which is properly estimated from the traffic of the entire system must be provided for the mobile exchange office.

SUMMARY OF THE INVENTION

It is an object of the present invention to reduce the number of coder-decoder units for high-efficiency coding arranged in a concentrated manner in a mobile exchange office to a number which is both considerably smaller than the total number of base stations and which appropriately corresponds to the traffic amount of the entire system, and at the same time to prevent occurrence of a degradation phenomenon, i.e., interruptions of the service at the initial stage of the setting procedure of a communication channel for a call origination and handover.

According to the present invention, there is provided a mobile communications system to which high-efficiency coding is applied comprising coder-decoder units for high-efficiency coding installed in a mobile exchange office, communications circuits extending from base stations to the mobile exchange office, and change-over means in the mobile exchange office for arbitrarily connecting the coder-decoder units and the communications circuits.

According to another aspect of this invention, there is provided a communication channel control method for a mobile communications system in which coder-decoder units for high-efficiency coding installed in a mobile exchange office are connected to communications circuits extending from each base station to the mobile exchange office, comprising the steps of, when the necessity for setting a communication channel arises in one of the base stations, assigning one of the coder-decoder units which is to be used, connecting the assigned coder-decoder unit to the communications circuit extending from the base station, and setting the communication channel when synchronization is established between the base station and the coder-decoder unit.

DESCRIPTION OF THE PREFERRED EMBODIMENTS

Embodiments of the present invention are described below with reference to the drawings.

Figure 1:
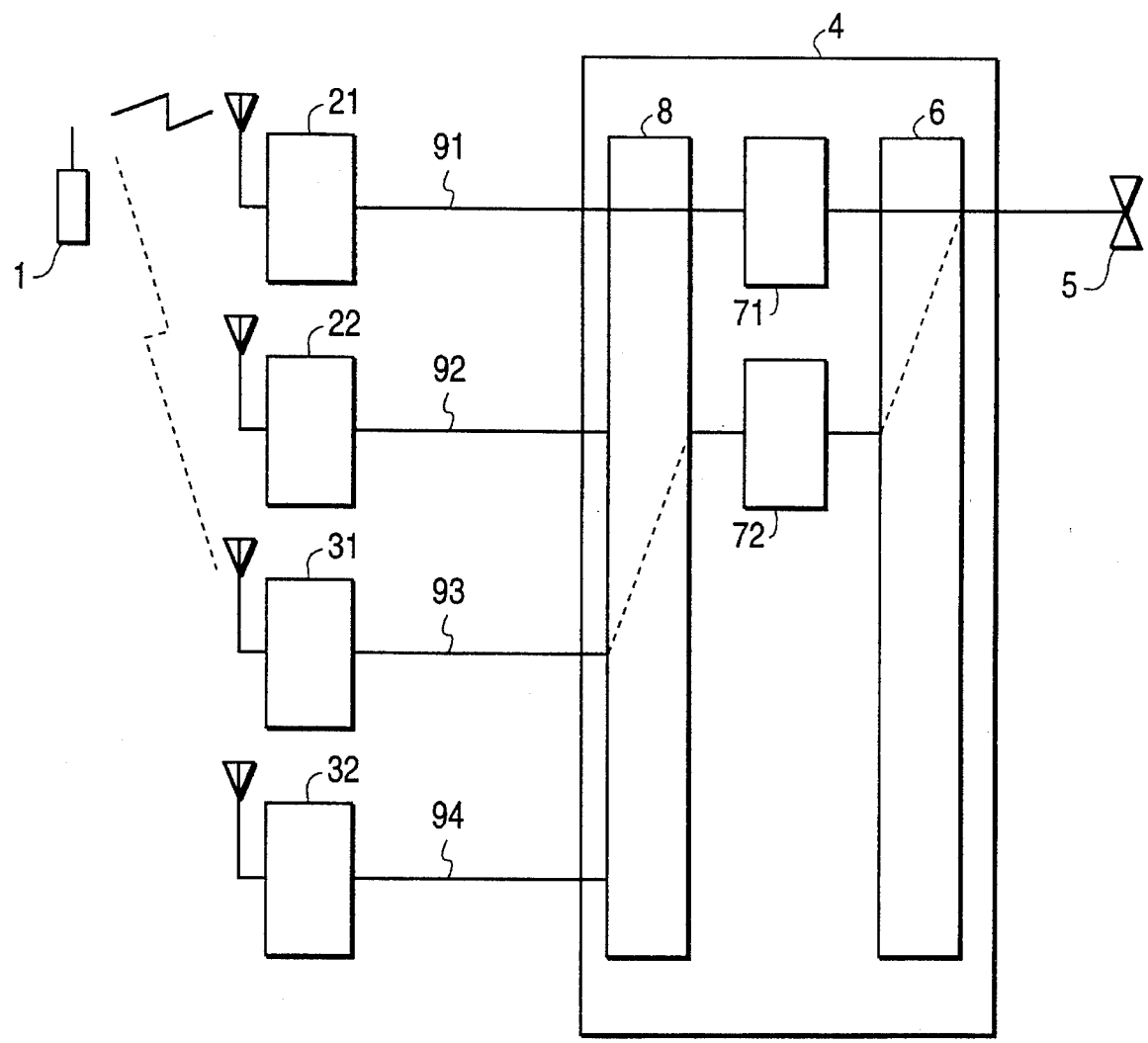
FIG. 1 is a block diagram showing the construction of an embodiment of a mobile communications system of the present invention.
Figure 4:
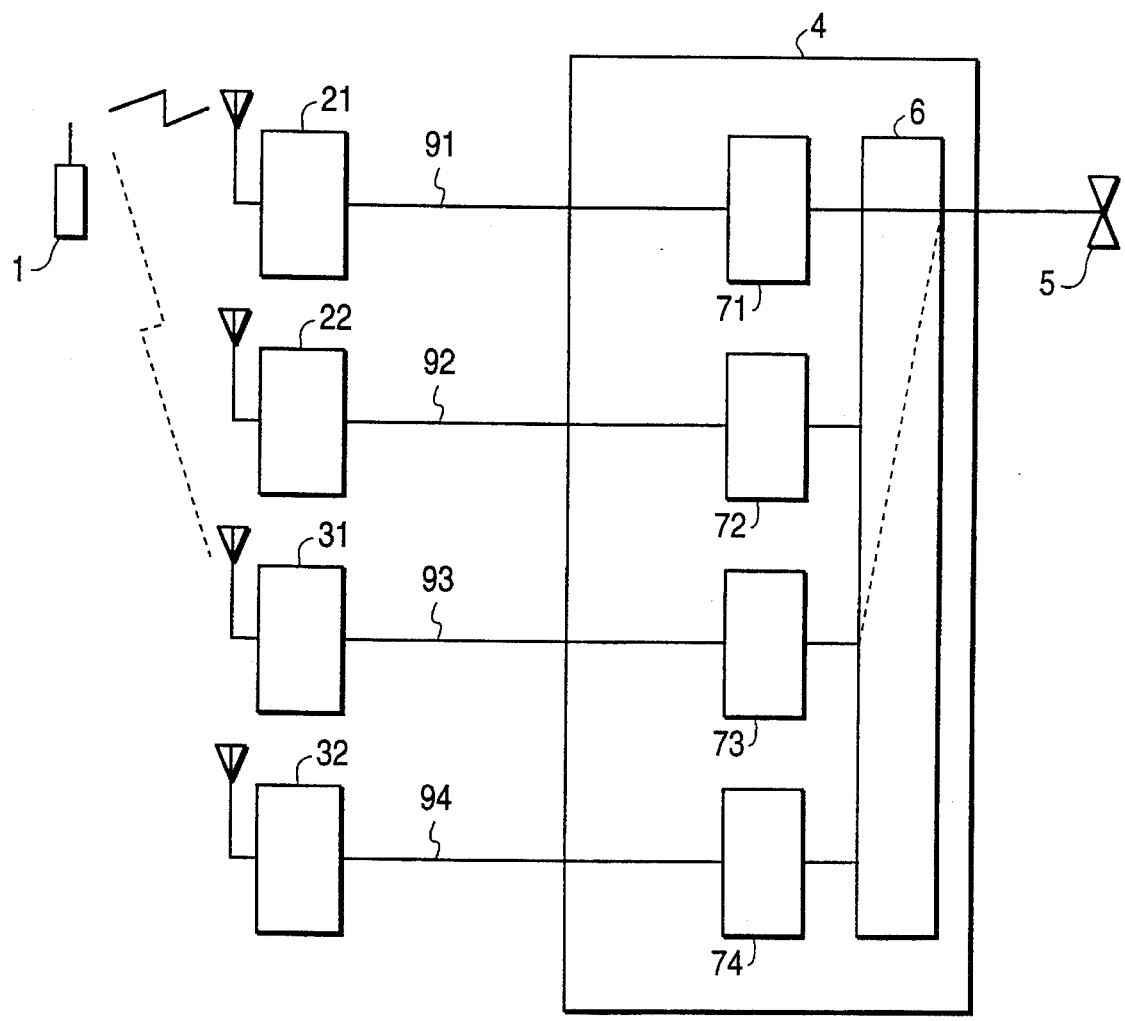
FIG. 4 is a block diagram showing an example of the construction of a conventional mobile communications system.

The mobile communications system shown in FIG. 1 is different from the mobile communications system shown in FIG. 4 in that the number of high-efficiency coder-decoder units for high efficiency coding (hereinafter referred to as coder-decoder units) placed in a mobile exchange office is reduced and circuit switch 8 is interposed between coder-decoder units 71, 72 and communications circuits 91 to 94. Communications circuits 91, 92, 93 and 94 extend from base stations 21, 22, 23 and 24, respectively, to circuit switch 8 placed in mobile exchange office 4, and coder-decoder units 71, 72 are interposed between circuit switch 8 and channel switch 6. Thus, communications circuits extending from a plurality of base stations at a same or different sites to mobile exchange office 4 are connected to a coder-decoder unit which is assigned for use in accordance with the necessity of setting of a communication channel by way of circuit switch 8.

Next, a communication channel control method is described with reference to FIGS. 1, 2 and 3 for a case when the mobile station 1 originates a call from the service area of base station 21 to the other communications party 5, and for a case of handing-over when the mobile station 1 in service moves from the service area of base station 21 into the service area of base station 31 during a communication.

Figure 2:
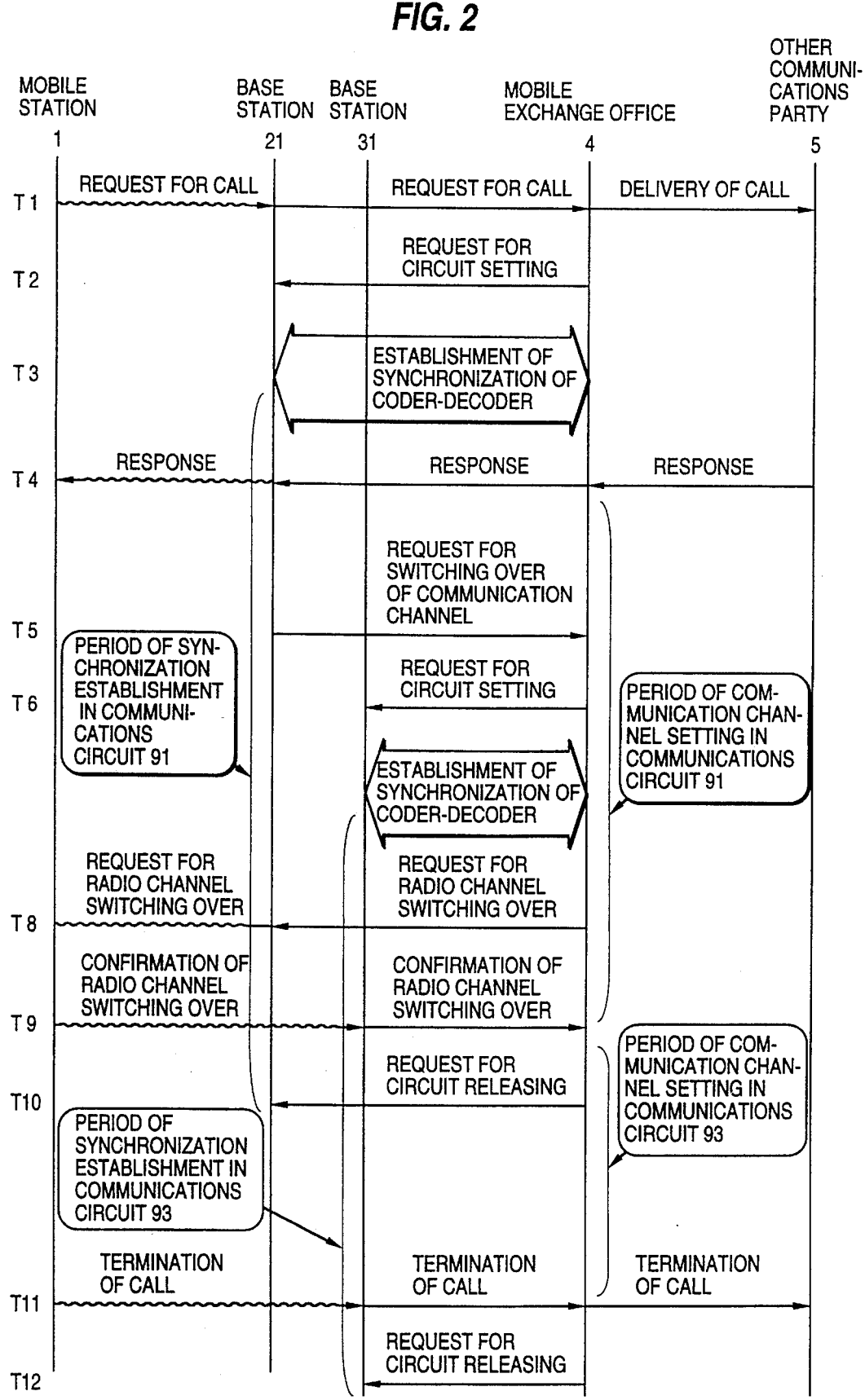
FIG. 2 is a sequence diagram illustrating a procedure of communications of signals among a mobile station, base stations, a mobile exchange office, and the other communications party in the case of origination of a call in an embodiment of a communication channel control method of the second aspect of the present invention.

Referring to FIG. 2, when mobile exchange office 4 accepts a request from mobile station 1 for a communication with the other communications party 5 by way of base station 21, it delivers the call to the other communications party 5 (T1). Meanwhile, mobile exchange office 4 assigns coder-decoder unit 71 and delivers a request for circuit setting to radio base station 21 (T2), connects communications circuit 91 to coder-decoder unit 71 by means of circuit switch 8, and establishes synchronization between base station 21 and coder-decoder unit 71 (T3). Thereafter, when mobile exchange office 4 detects the response of the other communications party 5, it sets a communication channel from mobile station 1 to the other communications party 5 by means of channel switch 6 (T4).

When mobile station 1 moves from the service area of base station 21 into the service area of base station 31 during the service, base station 21 delivers a request to mobile exchange office 4 for switching-over of the communication channel (T5). Mobile exchange office 4 assigns coder-decoder unit 72 and delivers to base station 31 a request for circuit setting with mobile station 1 (T6), connects communications circuit 93 to coder-decoder unit 72 by means of circuit switch 8, and establishes synchronization between base station 31 and coder-decoder unit 72 (T7). Thereafter, mobile exchange office 4 delivers to mobile station 1 a request for radio channel switching-over by way of base station 21 (T8). When mobile exchange office 4 receives a confirmation of radio channel switching-over from mobile station 1 by way of base station 31 (T9), it connects coder-decoder unit 72 to the other communications party 5 by means of channel switch 6 and releases the communication channel between coder-decoder unit 71 and the other communications party 5. Further, mobile exchange office 4 delivers a request to base station 21 for circuit releasing and releases the connection between communications circuit 91 and coder-decoder unit 71 by means of circuit switch 8 (T10).

When the communication finishes, mobile exchange office 4 detects disconnection of mobile station 1 by way of base station 31 (T11), and delivers a request to base station 31 for circuit releasing (T12). Further, mobile exchange office 4 releases the connection between the communications circuit 93 and coder-decoder unit 72 by means of circuit switch 8 and further releases the channel between coder-decoder unit 72 and the other communications party 5 by means of channel switch 6.

Figure 3:
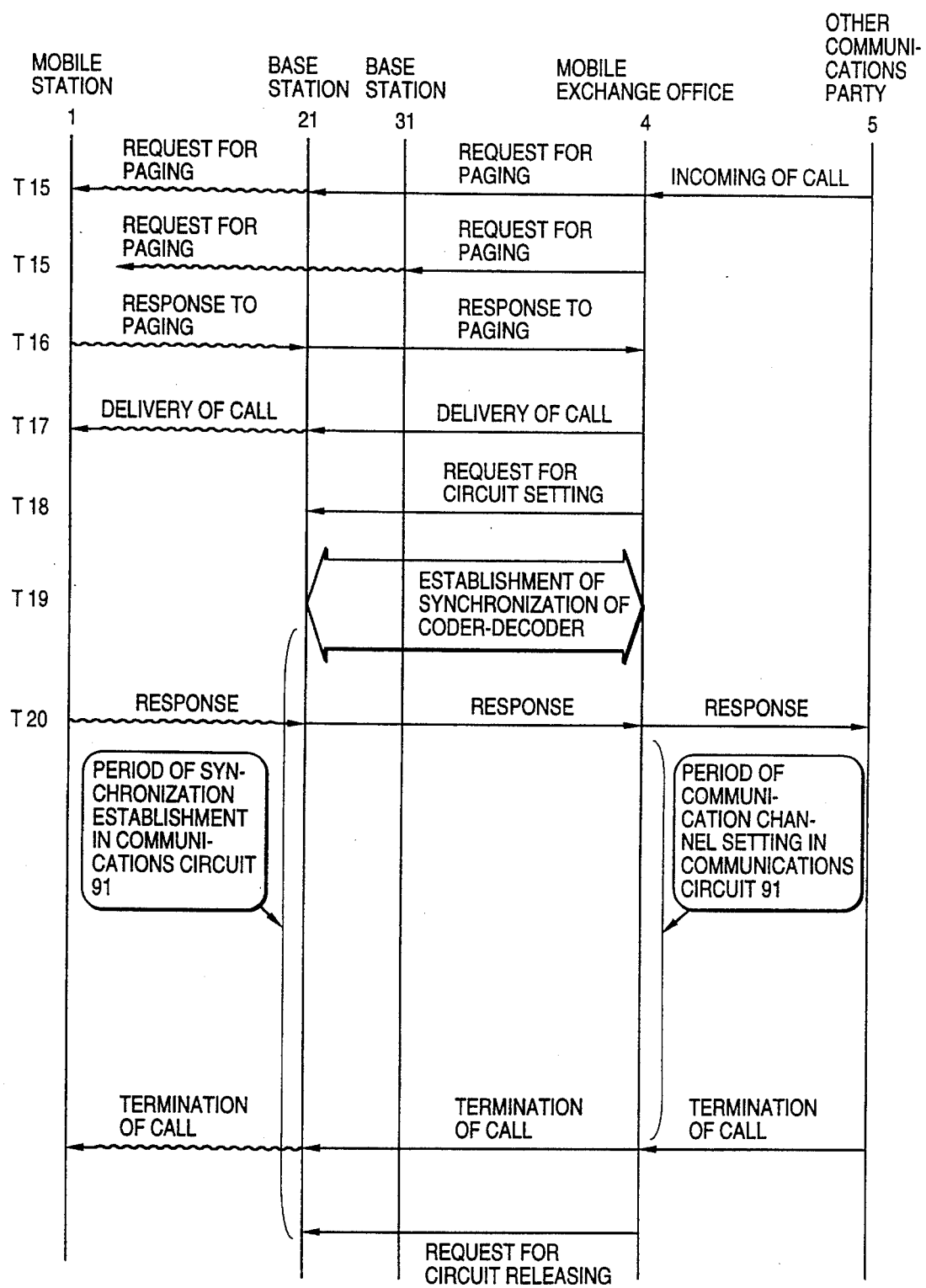
FIG. 3 is a sequence diagram illustrating a procedure of communications of signals among a mobile station, base stations, a mobile exchange office, and the other communications party in the case of arrival of a call in the same embodiment of FIG. 3.

Next is described the arrival of a call from the other communications party 5 at mobile station 1 positioned in the service area of base station 21 with reference to FIGS. 1 and 3.

When mobile exchange office 4 accepts an incoming call to mobile station 1 from the other communications party 5, it delivers to mobile station 1 a request for paging by way of base station 21 and base station 31 (T15). When mobile exchange 4 accepts a paging response from mobile station 1 by way of base station 21 (T16), it delivers a call to mobile station 1 by way of base station 21 (T17). Mobile exchange office 4 assigns coder-decoder unit 71 and delivers to base station 21 a request for circuit setting (T18). Thereafter, mobile exchange office 4 establishes connection between communications circuit 91 from base station 21 and coder-decoder unit 71 by means of circuit switch 8 and then establishes synchronization between base station 21 and coder-decoder unit 71 (T19). Further, when mobile exchange office 4 detects a response of mobile station 1, it sets a communication channel from the other communications party 5 to mobile station 1 (T20). Thereafter, the process until the termination of the call is similar to that shown in FIG. 2.

In the embodiment described above, channel switch 6 and circuit switch 8 are described as having separate constructions, but they may otherwise be a unified apparatus. Further, a call to a terminating party can be delivered at any point of time before synchronization of a coder-decoder unit is established without causing problems. Accordingly, the construction of the apparatus in mobile exchange office 4 and the procedure of communication of signals are not limited to those of the embodiment described above.

It is to be noted that an alternative arrangement might be possible in which coder-decoder units are installed in an intermediate location between a plurality of base stations and a mobile exchange office. However, as long as the communications circuits are effected from the base stations to the coder-decoder units by way of a circuit switch, such a construction is equivalent to merely relocating a portion of the functions of the mobile exchange office of the present invention, and can therefore be considered as being within the spirit and scope of the present invention.

What is claimed is:

1. A mobile communications system to which high-efficiency coding is utilized between a plurality of mobile stations and a mobile exchange office, comprising:

a plurality of base stations each provided with at least one communications circuit for providing communications with the mobile exchange office;

a circuit switch provided in the mobile exchange office and having a plurality of inputs respectively connected to the corresponding communications circuits of the plurality of base stations, said circuit switch further having a plurality of outputs;

a plurality of high efficiency coder-decoder units provided in the mobile exchange office and being respectively connected to a corresponding one of the plurality of outputs of the circuit switch, wherein a number of said plurality of outputs of said circuit switch is equal to a number of said plurality of high efficiency coder-decoder units; and a channel switch having a plurality of inputs respectively connected to said plurality of high efficiency coder-decoder units and having an output providing a connection to another communications party, said channel switch setting a communications channel from one of said mobile stations to the another communications party, wherein when said one of said mobile stations moves from a first region covered by one of said base stations to a second region covered by another of said base stations, said circuit switch provides switching from one of said high efficiency coder-decoder units used for said communications channel to another of said high efficiency coder-decoder units, wherein said one of said mobile stations is provided with a new communications channel after synchronization between said another of said base stations and said another of said high efficiency coder-decoder units has been established, and wherein said number of said plurality of high efficiency coder-decoder units is less than a number of said plurality of base stations.

* * * * *